April 5, 1955  J. M. DI GIORGIO  2,705,657
LIFT AND SUPPORT ATTACHMENT FOR RECEPTACLE COVERS
Filed Feb. 25, 1953
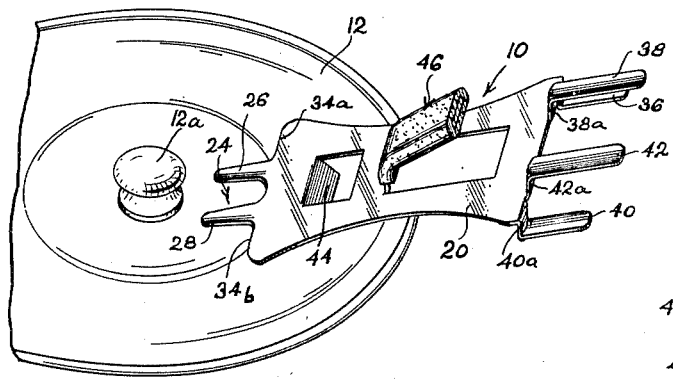
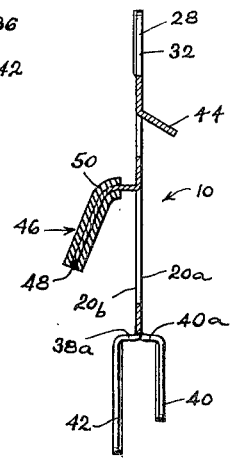
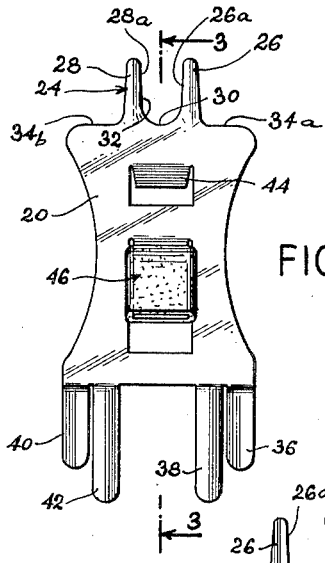
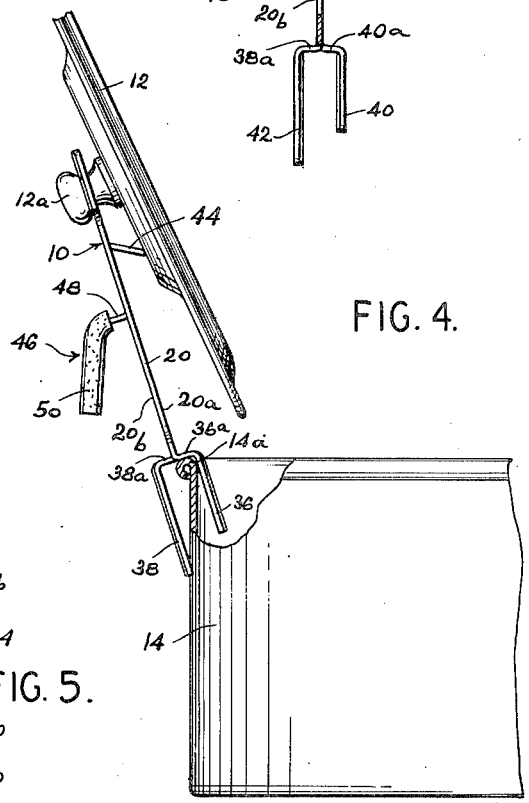
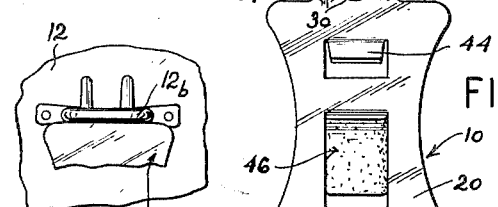
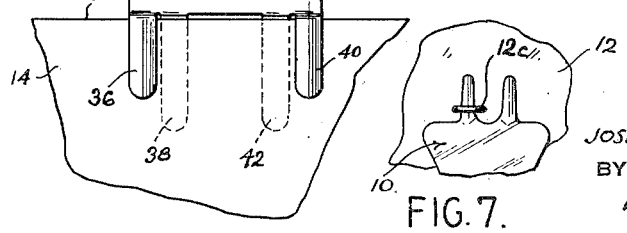
INVENTOR
JOSEPH M. DI GIORGIO
BY Morton Amster
ATTORNEY United States Patent Office 2,705,657
Patented Apr. 5, 1955

2,705,657

LIFT AND SUPPORT ATTACHMENT FOR RECEPTACLE COVERS

Joseph M. Di Giorgio, Bronx, N. Y.

Application February 25, 1953, Serial No. 338,764

5 Claims. (Cl. 294—27)

The present invention relates to supports for cooking utensils and particularly to a combined lift and support attachment for removing a lid or cover from a receptacle and mounting the lid or cover directly on the receptacle.

In preparing various foods, it is customary to employ receptacles having removable lids or covers. At times, these covers must be removed for ascertaining whether the food is cooked, for adding additional ingredients, for stirring, and the like. When a lid is removed, the person cooking either holds onto the lid, or places same on a convenient accessible support, such as the stove itself. The disadvantages of placing the lid directly on the stove are manifest, among them the problem of finding adequate space, the required handling of relatively hot lids, and the risk of soiling the stove, especially when considering the presence of condensation products incident in cooking on the underside of the lid.

A number of holders are known for supporting the removable receptacle lid directly on the receptacle itself and obviating some of these mentioned difficulties. However, none of these known holders meet the requirements of a simple yet effective combined lift and support member for mounting the lid on the receptacle in a manner assuring return of the condensation products to the receptacle, yet allowing for support of the wide variety of receptacle lids normally encountered. In addition to meeting the requirements of adaptability, and the ability to achieve the intended function, it is equally important that the holders be manufactured by mass production techniques at relatively low unit cost.

Accordingly, it is an object of the present invention to provide a novel holder of the aforesaid character, incorporating one or more of the mentioned desirable features. More particularly, it is within the contemplation of the present invention to provide novel means by which a cover may be lifted from a receptacle and supported on the receptacle in a position not interfering with free access to the contents of the receptacle, yet assuring return of condensation products on the cover to the receptacle by gravity.

A further object of the present invention is to provide a novel combined lift and holding attachment which may be applied to a wide variety of pots by simple manual manipulation and is foolproof for the intended purposes.

The above and still further objects, features and advantages of the present invention will be understood by those skilled in the art by reference to the description of a preferred embodiment in accordance with the present invention, the specific description pointing out the exact and complete manner in which I have made a patentable advance in the arts and sciences. The description will be best understood by reference to the drawing, wherein:

Fig. 1 is a perspective view showing the combined lift and support attachment of the present invention prior to engaging a cover, the cover being shown with a fragment broken away;

Fig. 2 is an elevational view of the attachment shown in Fig. 1;

Fig. 3 is a sectional view taken along the line 3—3 and looking in the direction of the arrows;

Fig. 4 is an elevational view, with parts broken away, showing the attachment supporting a cover or lid having a knob and mounting the cover on the receptacle;

Fig. 5 is a fragmentary elevational view of the attachment in its supported position on the receptacle, viewed from the right of Fig. 4;

Fig. 6 is a fragmentary plan view showing an alternate way of employing the attachment of the present invention when the cover utilizes a relatively wide curved handle in lieu of a knob; and Fig. 7 is a fragmentary plan view similar to Fig. 6, but showing the attachment used in conjunction with a relatively narrow curved handle.

Referring now specifically to the drawings, there is shown the attachment of the present invention, generally designated by the reference numeral 10 which serves the dual function of lifting a cover 12 from a receptacle 14 and thereafter providing a supporting pedestal for the cover, as seen best in Fig. 4. Specifically, the attachment includes an elongated body 20 fabricated of flat sheet material and contoured to have a pleasant appearance.

One end of the body 20 is provided with gripping means for engaging the lifting part 12a of the cover or lid 12 which is to be supported on the receptacle proper 14. The lifting part may take the form of the knob 12a, seen in Fig. 1; a relatively wide curved handle 12b, seen in Fig. 6; or a relatively narrow curved handle 12c, seen in Fig. 7. The gripping means, generally designated by the numeral 24, includes a pair of projecting fingers 26, 28 extending generally in the same direction and substantially parallel to each other. The inner faces 26a, 28a of the fingers 26, 28 are arranged in convergent relation with respect to each other and joined by a curved bight 30 to define a cut-out 32 decreasing in width from the free extremities of the fingers 26, 28 inwardly toward the bight. The maximum and minimum widths of the cut-out 32 are selected in accordance with the range of the reduced necks most prevalently encountered with knobs 12a of the type illustrated in Fig. 1.

The separation between the fingers 26, 28 is selected so that the fingers may be readily accommodated within the relatively curved handles 12b of Fig. 6. The adjacent end faces 34a, 34b of the body 20 serve as abutments or stops, and in conjunction with the fingers 26, 28, facilitate lifting of the covers.

The width of the individual fingers 26, 28 is selected to accommodate the smaller size curved handles 12c of Fig. 7. Each of the fingers 26, 28 is formed with a substantially V-shaped cross-section to assure requisite structural strength of the fingers, although the starting material used is a relatively thin gauged sheet.

At the end of the elongated body 20, remote from the fingers 26, 28, there are provided plural depending legs or feet, respectively designated by the reference numerals 36, 38, and 40, 42. The legs or feet 36, 40 are arranged in substantially the same plane and are offset inwardly from the flat body 20, as seen best in Fig. 3, by the connecting parts 36a, 40a. Similarly, the depending feet 38, 42 are offset outwardly from the plane of the body 20 and supported by the connecting parts 38a, 42a. The symmetrical arrangement of the depending feet or legs 36, 38, 40, 42 provides a pedestal which straddles the marginal edge 14a of the receptacle 14 with the longer outer legs 38, 42 bearing against spaced peripheral portions of the outer surface of the receptacle. The inner legs 36, 40, are made somewhat shorter than the outer legs to allow the receptacle to be almost completely filled without immersing the legs 36, 40 in the foodstuff therein.

Projecting inwardly from the innermost face 20a of the body 20 is a prop 44 arranged at an acute angle relative to the face 20a and inclined downwardly. The prop 44 serves to support the lid 12 in an inclined position with at least the lowermost part of the cover or lid lying inwardly of the marginal edge 14a of the receptacle 14 and generally over the open top so that condensation products collected on the inner face of the cover may gravitate into the receptacle.

Below the prop 44 and extending outwardly from the face 20b opposite the face 20a, is a handle 46 including a curved shank 48, preferably encircled by a non-conductive gripping part 50, such as a length of rubber tubing or similar non-conductive material.

Preferably the attachment is integrally fabricated from a sheet metal blank stamped into the form illustrated in Figs. 1 to 5. Specifically, a flat sheet of metal of a gauge selected in accordance with the required structural strength is processed by die operations to provide the integral fingers 26, 28 of V-shaped cross-section, the integral and laterally offset feet 36, 38, 40, 42, likewise reinforced by imparting a general V-shaped cross-section thereto, the integral prop 44 struck out from an intermediate portion of the body 20 and extending inwardly therefrom, and the integral handle shank 48 struck out from the body below the prop 44 and extending in the opposite direction from the body. The entire attachment, except for the grip part 50 may be fabricated in a single die operation. Thereafter the grip part is applied as illustrated, or by dipping the shank 48 into a suitable mass of plastic or like material.

The device is used in substantially the following manner in conjunction with a cover 12 having a knob 12a:

The handle 46 is grasped between the thumb and forefingers with the gripping fingers 26, 28 encircled about the reduced neck of the knob 12a. Upon exerting an inwardly directed force on the attachment, the reduced neck will assume a locked position in the tapered cut-out 32 in accordance with the cross-sectional area of the neck. Thereupon the cover may be lifted by aid of the attachment and manipulated into the position of Fig. 4 wherein the attachment serves as a pedestal for the cover 12, the outer longer legs 38, 42 serving as props and bearing against the outer periphery of the receptacle. Although a major portion of the cover is arranged outwardly of the marginal edge 14a of the receptacle 14, the proper inclination is imparted to the cover 12 by the prop 44 to assure return of condensation products via the lower end of the cover. In this manner the problem of dripping of the condensation products is overcome without interfering with ready access to the interior of the receptacle.

Specific reference will now be made to Fig. 6 where there is shown the mode of applying the attachment to a cover having a curved handle 12b of a width greater than the separation of the fingers 26, 28. In this connection, it is to be noted that the over-all width of the body 20, that is the distance between the opposite extremities of the stop or abutment surfaces 34a, 34b, is selected to accommodate the largest size handles encountered. With this type of cover, it is merely necessary to insert the fingers 26, 28 within the curved handle 12b and thereafter support the cover as shown in Fig. 4.

In Fig. 7 there is shown the manner of applying the device to handles having an overall width somewhat less than the separation between the fingers 26, 28. Under these circumstances, only one of the fingers is inserted within the curved handle 12c, the use of the device thereafter being the same as described in conjunction with Fig. 4.

While in accordance with the provisions of the statutes I have illustrated and described the best form of embodiment of my invention now known to me, it will be apparent to those skilled in the art that changes may be made in the form of the article disclosed without departing from the spirit of my invention as set forth in the appended claims and that in some cases certain features of my invention may be used to advantage without a corresponding use of other features.

I claim:

1. A combination lift and support attachment for removing a lid from a receptacle and mounting said lid directly on said receptacle comprising a substantially flat, elongated body, means adjacent one end of said body engageable with said lid for supporting same adjacent one face of said body, means adjacent the other end of said body engageable with said receptacle for supporting said lid adjacent the marginal edge of said receptacle, prop means projecting from said one face of said body and engaging said lid for inclining said lid inwardly of said marginal edge and generally over said receptacle, and a handle projecting from the opposite face of said body for manipulating said attachment.

2. A combination lift and support attachment for removing a lid from a receptacle and mounting said lid directly on said receptacle comprising a substantially flat, elongated body, means adjacent one end of said body engageable with said lid for supporting same adjacent one face of said body, means adjacent the other end of said body engageable with said receptacle for supporting said lid adjacent the marginal edge of said receptacle, and prop means projecting from said one face of said body and engaging said lid for inclining said lid inwardly of said marginal edge and generally over said receptacle, the means adjacent said one end of said body including a pair of spaced and generally parallel fingers, the inner edges of said fingers being arranged in convergent relation and defining a cutout of progressively decreasing width for various size lid knobs each having a reduced neck.

3. A combination lift and support attachment for removing a lid from a receptacle and mounting said lid directly on said receptacle comprising a substantially flat, elongated body, means adjacent one end of said body engageable with said lid for supporting same adjacent one face of said body, means adjacent the other end of said body engageable with said receptacle for supporting said lid adjacent the marginal edge of said receptacle, and prop means projecting from said one face of said body and engaging said lid for inclining said lid inwardly of said marginal edge and generally over said receptacle, the means adjacent said other end of said body including pairs of cooperating depending legs arranged to straddle the marginal edge of said receptacle.

4. A combination lift and support attachment for removing a lid from a receptacle and mounting said lid directly on said receptacle comprising a substantially flat, elongated body, a pair of gripping fingers adjacent one end of said body and engageable with said lid, depending feet adjacent the other end of said body and engageable with said receptacle for supporting said lid adjacent the marginal edge of said receptacle, a prop projecting angularly from said body in one direction and engaging said lid for inclining said lid inwardly of said marginal edge and generally over said receptacle, and a handle projecting from said body in the opposite direction for manipulating said attachment, said gripping fingers, depending feet, prop and handle being formed integrally with said body.

5. A combination lift and support attachment for removing a lid from a receptacle and mounting said lid directly on said receptacle comprising a substantially flat, elongated body, gripping fingers adjacent one end of said body engageable with said lid for supporting same adjacent one face of said body, depending feet adjacent the other end of said body engageable with said receptacle for supporting said lid adjacent the marginal edge of said receptacle, a prop projecting angularly from said one face of said body and engaging said lid for inclining said lid inwardly of said marginal edge and generally over said receptacle, a handle projecting from the opposite face of said body for manipulating said attachment, at least said prop and said handle being formed integrally with and struck from said body, and a heat-insulating cover on said handle.

References Cited in the file of this patent

UNITED STATES PATENTS

| 820,460 | Whitten | May 15, 1906 |
| 1,044,968 | Altmann | Nov. 19, 1912 |
| 1,134,905 | Prochaska | Apr. 6, 1915 |

FOREIGN PATENTS

| 947,837 | France | Jan. 17, 1949 |